(12) United States Patent
Meier et al.

(10) Patent No.: US 8,374,122 B2
(45) Date of Patent: Feb. 12, 2013

(54) SYSTEM AND METHOD FOR INTEGRATED WIFI/WIMAX NEIGHBOR AP DISCOVERY AND AP ADVERTISEMENT

(75) Inventors: Robert C. Meier, Cuyahoga Falls, OH (US); Keith Dettloff, Burbank, CA (US); John G. Waclawsky, Frederick, MD (US)

(73) Assignee: Cisco Technology, Inc., San Jose, CA (US)

( * ) Notice: Subject to any disclaimer, the term of this patent is extended or adjusted under 35 U.S.C. 154(b) by 1656 days.

(21) Appl. No.: 11/313,385

(22) Filed: Dec. 21, 2005

(65) Prior Publication Data

US 2007/0140163 A1    Jun. 21, 2007

(51) Int. Cl.
*H04W 4/00*    (2009.01)
*H04W 36/00*    (2009.01)

(52) U.S. Cl. ......... 370/328; 370/331; 455/443; 455/444

(58) Field of Classification Search .................. 370/328, 370/331

See application file for complete search history.

(56) References Cited

U.S. PATENT DOCUMENTS

| | | | |
|---|---|---|---|
| 7,412,240 B2 * | 8/2008 | Hunkeler | 455/436 |
| 7,706,789 B2 * | 4/2010 | Qi et al. | 455/432.1 |
| 2004/0218562 A1 | 11/2004 | Orava et al. | |
| 2004/0264410 A1 * | 12/2004 | Sagi et al. | 370/331 |
| 2005/0195753 A1 | 9/2005 | Chaskar | |
| 2005/0232211 A1 | 10/2005 | Abhishek et al. | |
| 2005/0254442 A1 | 11/2005 | Proctor, Jr. et al. | |

FOREIGN PATENT DOCUMENTS

CN    1578490 A    2/2005

OTHER PUBLICATIONS

PCT/ISA/210—Int'l Search Report, Oct. 16, 2007, Int'l Searching Authority.

* cited by examiner

*Primary Examiner* — Huy C Ho
(74) *Attorney, Agent, or Firm* — Tucker Ellis LLP (57) ABSTRACT

A system and method wherein mobile nodes scan both 802.16 and 802.11 radio channels for neighbor access points. A mobile node reports both WiMax and WiFi neighbor access points to its parent access point. A parent access point advertises both WiMax and WiFi neighbor access points to child mobile nodes to facilitate faster roaming and load balancing. A parent WiMax AP can direct a mobile node to roam to a neighbor WiFi access point that has a lighter load or offers enhanced services. As an option, a location tracking protocol is used to determine the location of a mobile node and the mobile node's parent AP advertises neighbor APs that offer services in the mobile node's location.

14 Claims, 5 Drawing Sheets

SYSTEM AND METHOD FOR INTEGRATED WIFI/WIMAX NEIGHBOR AP DISCOVERY AND AP ADVERTISEMENT

BACKGROUND OF THE INVENTION

The present invention relates generally to wireless networks and more specifically to multiple overlapping wireless networks with multi-mode mobile nodes.

The existing IEEE 802.16e and IEEE 802.11k draft standards both define a method where an AP (Access Point) can determine a list of neighbor APs and advertise the list of neighbor APs to MNs (Mobile Nodes). A neighbor AP is consistently identified by an 802 radio port address or "APRID", in both the 802.16e and 802.11k draft standards.

Currently, a WiFi AP or WiMax AP discovers neighbor APs, with the same radio type, in a couple ways:

1) An AP directly discovers a neighbor AP by scanning multiple channels for messages sent by the neighbor AP; or
2) MNs scan multiple channels for nearby APs and report scanned APs to parent APs.

The IEEE 802.16e draft standard defines a method where a parent WiMax AP can request or direct a child MN to roam to a neighbor WiMax AP. For example, a parent AP may direct a MN to roam to a neighbor AP that is more lightly-loaded.

WiFi APs that provide access to a "distribution network" (i.e. such as a WMAN) are grouped into an "Extended Service Set" (ESS) and share one or more Service Set Identifiers or SSIDs. A MN must be configured with a matching SSID to join the Extended Service Set (ESS). WiFi APs advertise the list of supported SSIDs in Beacons and Probe Response messages; so that MNs can easily determine the set of APs that belong to the same ESS. The 802.16 draft standard does not provide a comparable method for grouping WiMax APs into an ESS. Presumably, only one WiMax Service Provider can provide WiMax coverage in a give area.

A WMAN may contain multiple "wireless domains", as described above. In practice, a wireless domain typically corresponds to a set of IP subnets. Inter-wireless-domain roaming is generally more "expensive" than intra-wireless-domain roaming. For example, when a MN roams to a new parent AP in a different domain, the MN may lose access to its current home subnet.

A rogue AP may masquerade as an authorized AP by spoofing the authorized AP's SSID(s) and APRID in AP advertisement messages. For example, a rogue WiFi AP may send 802.11 Beacon messages that contain the SSID and APRID (i.e. 802.11 BSSID) of a different authorized WiFi AP. A Management Frame Protection (MFP) protocol can be used, in part, to authenticate Beacon and Probe Response frames with a secret group key that is shared by authorized APs and authorized MNs. The MFP protocol enables WiFi MNs to detect and avoid rogue WiFi APs. A MN reports a detected rogue AP to its parent AP, so that the parent AP can generate an alert.

Multi-mode mobile nodes (MNs) are capable of operating with two (or more) radio types. Typically, a multi-mode MN scans channels on the networks it is configured to operate, e.g. scan WiMax (i.e. IEEE 802.16) channels and scan WiFi (i.e. IEEE 802.11) channels. A problem with current systems is that the networks (e.g. WiMax and WiFi networks) operate totally independently, which can cause problems for a multimode radio. For example, while connected to a parent AP in one mode, it must continually scan channels for the other mode because the parent AP is unaware of AP's in the other radio mode. As another example, a multi-mode radio might be operating in WiMax mode when an alert is sent for a rogue AP on the WiFi network, causing it to miss the alert and when the MN changes to WiFi mode, the MN may attempt to associate with the rogue AP because it missed the alert.

Although the above discussion refers to networks with WiMax and WiFi, those skilled in the art can readily appreciate that the concepts described herein are readily adaptable to encompass any combination of radio technologies such as GSM, Bluetooth and CDMA.

BRIEF SUMMARY OF THE INVENTION

In accordance with an aspect of the present invention, there is described herein a system and method wherein mobile nodes scan a plurality (e.g. both 802.16 and 802.11) radio channels for neighbor access points. A mobile node reports both WiMax and WiFi neighbor access points to its parent access point. A parent access point advertises both WiMax and WiFi neighbor access points to child access points to facilitate faster roaming and load balancing. A parent WiMax AP can direct a mobile node to roam to a neighbor WiFi access point that has a lighter load or offers enhanced services.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the invention. Accordingly, the drawing and description will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

DETAILED DESCRIPTION OF INVENTION

Throughout this description, the preferred embodiment and examples shown should be considered as exemplars, rather than limitations, of the present invention. An aspect of the present invention provides for integrated neighbor AP discovery for AP's on two different types of networks (e.g. WiMax/WiFi) and AP advertisement that facilitates enhanced roaming in a Wireless Metropolitan Area Network (WMAN).

For example, the network comprises "WiMax" access points (APs), equipped with an IEEE 802.16e-compliant "WiMax" radio, "WiFi" APs, equipped with an IEEE 802.11-compliant radio, and dual-mode WiFi/WiMax mobile nodes (MNs), equipped with both a "WiMax" radio and a "WiFi" radio. In a preferred embodiment, long-range WiMax APs will provide a an "umbrella" wireless network that spans an entire metropolitan area; whereas, relatively short-range WiFi APs provide high-speed "overlay" 802.11 radio coverage in select, relatively small, hot-spot areas. By definition, a first AP is a "neighbor" of a second AP if both APs belong to the same WMAN and if both APs provide radio coverage in the same physical area. A MN scans WiMax and WiFi radio channels and reports "scanned" APs to its parent AP. The parent AP constructs a combined list of WiMax and WiFi "neighbor" APs, for a given area, and "advertises" the list of APs to MNs in that area.

Within a WMAN, APs are grouped into one or more "wireless domains". Each wireless domain is controlled by a Wireless Domain Server (WDS). A single wireless domain may contain both WiMax and WiFi APs.

A MN has a single network layer protocol stack and is identified by a single 802 address. WiMax and WiFi APs and AP radio ports are also identified by an 802 address.

The integrated AP discovery and advertisement method provides the following features. A MN can easily determine if APs belong to the same WMAN. A WiMax or WiFi AP can discover and advertise a list of authorized WiMax and WiFi "neighbor" APs. A parent AP, with a first radio type, can advertise a wireless domain identifier and radio-specific parameters of a neighbor AP, which has a different radio type. Radio-specific parameters include the radio type, radio channel, beacon timing information, and loading information. A dual-mode WiMax/WiFi MN can quickly determine the "best" next WiMax or WiFi parent AP from the list of WiMax and WiFi APs advertised by its current parent AP. A parent AP can "request" or "direct" a MN to roam to a new parent AP with a different radio type. For example, a parent WiMax AP can direct a child MN to roam to a WiFi AP to offload the WiMax network or to enhance the MN's service. A parent AP with a first radio type can request or direct a MN to scan channels for a different radio type. WiMax/WiFi MNs report WiMax and WiFi rogue APs to parent APs, so that a parent AP can detect and report a rogue AP with a different radio type. A general-purpose MN Location Tracking Protocol is used to limit the list of neighbor APs for a single MN to those APs that cover the MN's location. Note that as used herein a "WMAN" denotes a logical topology rather than a physical metropolitan area. The concepts presented herein apply to any similar logical topology (e.g. to an enterprise campus network). These concepts are directed at 802.11 and 802.16 radio technology but can be expanded to encompass any combination of radio technologies including GSM, Bluetooth and CDMA.

In accordance with an aspect of the present invention, there are several techniques available to identify a set of WiMax and WiFi APs that belong to the same WMAN. By default, the set of WiMax APs that provide access to the WMAN can be defined by the radio coverage area. Optionally, WiMax APs can be configured with a WMAN identifier or a WMAN_ID. The WMAN_ID can be contained in an optional TLV (type length value) in 802.16 advertisement messages (e.g. in 802.16 DCD "Downlink Channel Descriptor" messages) so that MNs can easily determine the set of WiMax APs belonging to the WMAN. WiFi APs can be configured with a WMAN specific SSID (service set identifier) or WMAN_ID. The WMAN_ID can be advertised in a SSID element in 802.11 Beacon frames and in Probe Response messages, so that MNs can easily determine the set of WiFi APs that belong to a WMAN. In a preferred embodiment a WMAN_ID is a string and the same WMAN_ID is used for both WiMax and WiFi APs. WiMax and WiFi APs can, optionally, be configured with multiple WMAN_IDs, where each WMAN_ID corresponds to a different set of service parameters.

In a WMAN, WiMax and WiFi APs are grouped into one or more wireless domains. A Wireless Domain Server, or WDS, controls each wireless domain. A single wireless domain may contain both WiMax and WiFi APs.

In accordance with an aspect of the present invention, a single IEEE 802 address is used to identify a dual radio mode mobile node. An IEEE 802 address is also used to identify both WiMax and WiFi AP radio ports. The dual radio node mobile nodes scan for both WiFi and WiMax Access Points and report the results of the scan to the current Parent APs. Although as described herein this technique for neighbor discovery is described for WiMax and WiFi networks, those skilled in the art can readily appreciate that this neighbor discovery technique can encompass any combination of radio technologies including GSM, Bluetooth and CDMA.

A dual-mode WiMax/WiFi MN may independently scan both WiMax and WiFi radio channels. Alternatively, a parent WiMax or WiFi AP may direct a child MN to scan both WiMax and WiFi radio channels. A MN sends an 802.11k or 802.16e "scanning report" to report scanned APs its parent AP. An enhanced 802.11k or 802.16e scanning report includes both WiMax and WiFi "scanned" APs, so that the is parent AP can construct a complete list of WiMax and WiFi "neighbor" APs. A scanned AP, reported by a MN, may be a "neighbor" AP in the same WMAN or a "foreign" AP. A WiMax or WiFi scanned AP is consistently identified by an APRID (e.g. an IEEE 48-bit 802 address) in both 802.11k and 802.16e scanning reports.

A MN discovers a WiFi AP by listening for 802.11 AP Probe Response messages and periodic 802.11 AP Beacon messages. A MN discovers a WiMax AP by listening for periodic 802.16 DCD messages and periodic 802.16 UCD messages. A proprietary Wireless Domain ID TLV can be included in 802.11 Beacon and Probe Response messages and 802.16 DCD messages, so that a MN can easily determine the set of APs that belong to the same wireless domain.

Currently, an 802.11k-compliant MN can send a list of 1 or more 802.11k Beacon Report messages, to a parent WiFi AP, to report a list of "scanned" APs. Each entry in a Beacon Report element contains Regulatory Class, PHY Type, and Channel Number fields, which identify the radio type and radio channel of the respective neighbor AP. An 802.11k Beacon Report does not contain a WMAN ID, SSID, or Wireless Domain ID.

The 802.16e draft standard specifies that an 802.16e MN can send an 802.16e MOB_SCAN-REPORT message to a parent WiMax AP to report a list of 1 or more neighbor APs. An 802.16e MOB_SCAN-REPORT message does not include radio type or channel number information. An 802.16e MOB_SCAN-REPORT does not contain a WMAN ID, SSID, or Wireless Domain ID.

There are several techniques available for a WiMax or WiFi AP to determine operational parameters for scanned APs, with different radio types. For example, 802.11k Beacon Report messages, sent by authenticated MNs, can indicate the operational parameters (i.e. WMAN, wireless domain, radio type and radio channel) of a scanned AP, with a first radio type, to a parent AP, with a different (second) radio type. The radio parameters can be obtained in one or more TLVs (e.g. vendor specific TLVs). Radio parameters can include Regulatory Class and PHY Type values, which identify WiMax radio types, and WiMax Channel Number values. As another example, AP operational parameters can be stored in an AP registry in the distribution network. The AP registry can be distributed. A parent AP can query the AP registry to determine if a scanned AP is in the same WMAN and to obtain operational parameters for a neighbor AP.

Having MNs determine and report AP radio parameters is simpler for APs. If AP radio parameters are contained in scanning report messages, sent by MNs, then a parent AP does not need to query an AP registry to determine the radio parameters of a neighbor AP. However, querying an AP registry does not require changes to existing 802.11k and 802.16e scanning report messages; it is less dependent on MN support; and it decreases the amount of information sent over-the-air. A change in the set of operational parameters that an AP maintains for a neighbor AP does not require a corresponding change in the 802.11k or 802.16e scanning report protocols.

The AP registry technique can be supported in a Cisco WLCCP network, described in U.S. application Ser. No. 10/417,653 filed on Apr. 17, 2003, hereby incorporated by reference, available from Cisco System, Inc., 170 West Tasman Drive, San Jose, Calif. 95134 as follows. A WLCCP WMAN contains a WMAN Location Registry, or WLR. Each AP registers with its parent WDS and with the optional WLCCP WLAN Location Register (WLR). A WLCCP AP Registration Request can include a Wireless Domain ID and a list of Port Information TLVs, one for each AP radio port. Each Port TLV contains the APRID and operational parameters for the respective AP radio port. The operational parameters include the radio type and radio channel number.

Each WDS and the WLR maintain an AP registry, which contains a list of AP radio ports. Each entry in an AP registry is indexed by an APRID and contains information, for the respective AP radio port.

The existing 802.16e and 802.11k neighbor AP reports contain an "APRID" (i.e. an 802.16 BSID or an 802.11 BSSID), that uniquely identifies an AP radio. When a WiMax (or WiFi) AP receives a scanned AP report, for an unknown APRID, it can query its parent WDS to determine if the scanned AP is the same WMAN and to determine the radio parameters and Wireless Domain ID of the scanned AP. A WDS can query the WLR to determine the operational parameters for an AP that is not in the local wireless domain. A "scanned" AP is a neighbor AP if, and only if, it is listed in the, possibly distributed, AP registry; otherwise, a scanned AP is a "foreign" AP.

In accordance with an aspect of the present invention, APs have the ability to advertise the availability of radio channels and associated parameters and access points between disparate radio technologies. For example, an AP can advertise the availability of WiFi channels over WiMax channels and vice versa. Although AP advertisement is described in the context of WiMax and WiFi networks, AP advertisement can be expanded to encompass any combination of radio technologies including GSM, Bluetooth and CDMA.

Both the 802.11k and 802.16e standards include a method where an AP advertises a list of "neighbor" APs to child MNs. Neighbor AP advertisements facilitate fast roaming and load balancing. An 802.16e-compliant parent AP sends 802.16e MOB_NBR-ADV messages, to child MNs, to advertise neighbor APs. An 802.11k-compliant parentAP sends 802.11k Neighbor Report messages, to child MNs, to advertise neighbor APs.

In accordance with an aspect of the present invention, neighbor advertisement messages also indicate radio parameters, including the radio type and radio channel, of the respective neighbor AP. Neighbor advertisements can also include the wireless domain ID of the respective neighbor AP. In a preferred embodiment, all APs in a list of advertised "neighbor" APs belong to the same WMAN. Furthermore, an AP neighbor report element can include Regulatory Class and PHY Type values, which identify both WiMax and WiFi radio types, and WiMax and WiFi Channel Number values. For example, the 802.16e standard can be modified so that a WiMax parent AP can advertise both WiMax and WiFi neighbor APs in a MOB_NBR-ADV message. Furthermore, 802.16e MOB_NBR-ADV messages contain an existing Available Radio Resource field, which is used to indicate the available radio bandwidth of a neighbor AP. The available radio bandwidth is expressed as a percentage of the total bandwidth; therefore, a WiMax AP can advertise the relative "load" of a neighbor WiFi AP via the existing field.

Optionally, a new "wireless domain ID" field, can be employed in an 802.11k or 802.16e neighbor advertisement message, to explicitly identify the wireless domain of each AP in a neighbor AP list. Alternatively, a parent AP can order APs in a neighbor AP list so that APs in the parent AP's wireless domain are preferred over APs in a different domain.

A WMAN may only provide WiFi coverage in select areas and the coverage area of a relatively long-range WiMax AP may be much larger than WiFi coverage areas. Assume, for example, that a "power-save" WiMax/WiFi MN is attached to a parent WiMax AP in a location that is not covered by WiFi APs. In the absence of an integrated WiMax/WiFi neighbor AP advertisement service, the MN must frequently wake up and scan all WiFi channels to detect possible WiFi APs. It is only marginally helpful if the parent WiMax AP advertises "neighbor" WiFi APs that do not cover the MN's location. The MN must still periodically scan empty WiFi channels.

An aspect of the present invention contemplates limiting a list of neighbor APs, which are "advertised" by a parent AP to a single child MN, to only those APs that cover the MN's location, so that a MN does not need to repeatedly scan "empty" channels. A general-purpose Location Tracking Protocol (LTP) can be implemented in a WiMax-based WMAN. An application that utilizes the LTP can indicate nearby points of interest to MNs. A "point of interest" might be a restaurant or peripheral (e.g. a printer or a multifunction peripheral 'MFP'), for example.

An example general-purpose WiMax LTP will now be described. A MN periodically performs a "ranging operation" with neighbor APs within a "scanning interval". The ranging operation enables both the MN and neighbor APs to measure signal strengths at one or more power levels. The ranging operation may be comprised of any message exchange that enables multiple APs to measure a MN's signal strength within a small "scanning interval". The "ranging operation" is not limited to the standard 802.16 Ranging mechanism. Each AP reports the "ranging" signal strengths to a central management station (MS). The MS then aggregates the signal strengths, reported by multiple APs for a single MN, into a set of signal strengths that correspond to a specific location. Special "location-aware" MNs explicitly report their physical coordinates during ranging operations. The MS creates a "location database", which correlates each set of signal strengths to an actual physical location. When a normal MN performs the 802.16 ranging operation, the MS determines the MN's location by comparing the ranging signal strengths to signal strength sets in its location database. The MS can use a well-known algorithm to find a "matching" signal strength set and a corresponding physical location.

A second example LTP may utilize signal propagation delays. A MN may transmit a signal and each AP that receives the signal may transmit a reply signal. A MN can determine its distance from each AP by measuring the round-trip propagation delay. A MN's location can be determined by triangulating the distances from 3 or more APs.

An exemplary method for determining the set of WiFi APs that cover a MN's location is similar. A MS creates a "neighbor AP database", which correlates a location with a set of neighbor APs, reported by a MN. A location may correspond to a set of signal strengths, a set of measured round-trip delays, or coordinates derived from a set of measured round-trip delays. In a simple implementation, a "WiFi hot-spot database" may only contain representative entries for sets of neighbor APs that include at least one WiFi AP. It should be noted that this method does not require special location-aware MNs to report their physical coordinates. Instead, each normal MN must periodically scan radio channels, report "scanned" APs, and perform a ranging operation, within a "scanning interval". A MS determines a MN's "neighbor AP list" when the MN performs the ranging operation. The MS determines the MN's neighbor list by comparing the ranging signal strength set (or round-trip delays) to signal strength sets in its neighbor AP database. The same well-known algorithm is used to find a "matching" entry and a corresponding set of neighbor APs. If the database only contains entries for WiFi hot-spot locations, then the MS will not find a matching entry for a MN that is not in a hot-spot area. In that case, the neighbor AP list for the MN is comprised of all the WiMax APs in the MN's neighborhood. An aspect of this method is that it reduces the time that a MN spends scanning radio channels. In particular, a MN can scan WiFi channels with a very low frequency (i.e. several times an hour) if it is attached to a WiMax parent AP that is not advertising WiFi neighbor APs. Such a MN would occasionally scan WiFi channels to help populate the neighbor AP database maintained by the management station.

In accordance with an aspect of the present invention, a parent WiMax or WiFi AP can request or direct a MN to scan radio channels. A WiFi AP sends an 802.11k Measurement Request message, which contains a Beacon Request element, to request a child MN to scan for other APs on selected radio channels. In accord with an aspect of the present invention, a Beacon Request element can include Regulatory Class and PHY Type values, which identify WiMax radio types, and WiMax Channel Number values. A WiMax AP sends a MOB-_SCN-REQ message to direct a MN to scan radio channels during periodic "scanning intervals". A MOB_SCN-REQ does not contain radio type and radio channel fields. A WiMax/WiFi MN can simply scan WiMax and WiFi radio channels during its scanning intervals.

In accordance with an aspect of the present invention, a parent WiMax AP can explicitly request a child MN to roam to a neighbor AP to offload the parent AP and/or to increase the MN's service quality. A parent WiMax AP sends a message to direct a mobile node to roam to a WiMax neighbor AP or a WiFi neighbor AP. The current 802.16e MOB-BSHO-REQ message can be modified to enable a WiMax parent AP to direct a MN to roam to a WiFi neighbor AP. A WiMax parent AP can use the enhanced directed roaming mechanism to direct a MN to a WiFi neighbor AP that has more available bandwidth and/or offers enhanced services.

In accordance with an aspect of the present invention, the existing Cisco 802.11 Management Frame Protection (MFP) protocol can be extended to protect 802.16 DCD and UCD messages, so that a MN can detect DCD and UCD messages sent by rogue WiMax APs. A WDS can securely distribute MFP group keys to both WiMax and WiFi child APs. A radio-dependent method can be used to install an MFP group key in a MN. For example, a parent WiMax AP can use the 802.16e Authentication Key (AK), which it shares with a child MN, and the existing 802.16 Traffic Encryption Key delivery protocol, to securely deliver an MFP group key to a child MN.

The existing 802.16e and 802.11k "scanned AP" reporting methods, described herein, can also have the capability to enable a MN to report a WiMax or WiFi rogue AP to its parent AP. Alternatively, a MN can use an enhanced Cisco-proprietary MFP message to report rogue APs to its parent AP.

Figure 1:
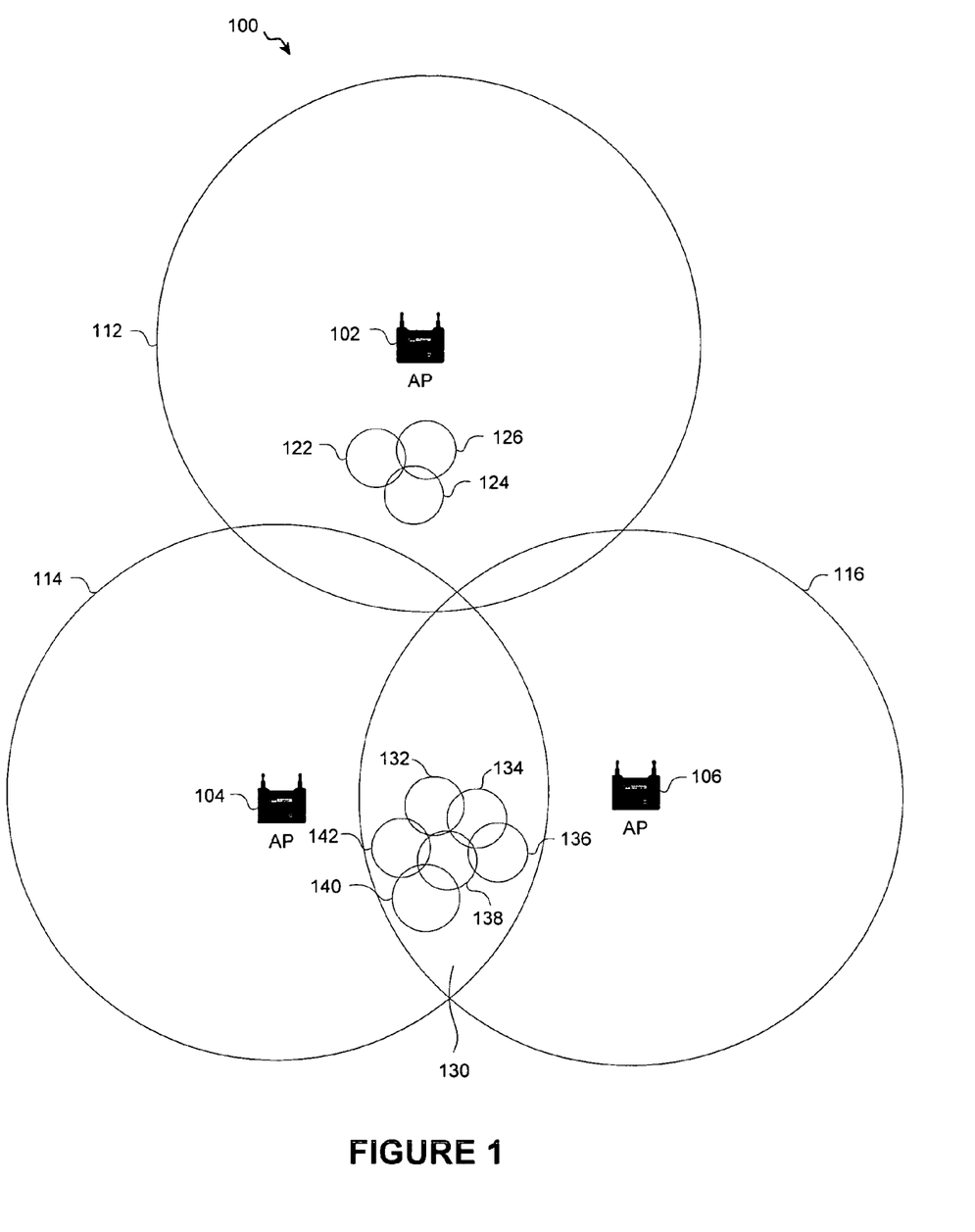
FIG. 1 is a diagram of a network employing multiple radio types.

Referring to FIG. 1, there is illustrated an example of a network 100 employing multiple radio types. Network 100 comprises three access points 102, 104, 106 that operate using a first radio type (e.g. WiMax). Each access point 102, 104, 106 has a corresponding coverage area 112, 114, 116 respectively. Coverage area 130 represents an area that is serviced by both access points 104 and 106.

Network 100 also contains additional coverage areas 122, 124, 126, 132, 134, 136, 138, 140 and 142 for radios of a second radio type (e.g. WiFi). A multi-mode mobile node can either be associated with an access point 102, 104, 106 of the first radio type, or with an access point (not shown) of a second radio type if near the coverage areas 122, 124, 126, 132, 134, 136, 138, 140, 142 for the second access point type. For example, a multi-mode mobile node in coverage area 112 can associate with access point 102, or with the access point associated with one of coverage areas 122, 124, 126 depending on the location of the mobile node within coverage area 112. A mobile node in coverage area 130 can either be associated with an access point 104, 106 of the first radio type or with the access point of a second radio type if within coverage areas 132, 134, 136, 138, 140, 142.

As an example, a multi-mode mobile node within coverage area 112 scans for access points of the first radio type 102, and for access points of the second radio type (e.g. the access points associated with coverage areas 122, 124, 126). The mobile node then reports the results of the scans to its parent access point, which can either be AP 102 or the appropriate area for the location of the access point if within coverage areas 122, 124, 126. The mobile node may send reports listing APs of both radio types (e.g. APs 102, 104, 106 and APs associated with coverage areas 122, 124, 126, 132, 134, 136, 138, 140 and 142 as detected). The mobile node utilizes the same client address when performing the scan for the first radio types and the second radio types, and in sending the report to the parent AP, the same client address is used as the client reporting both radio types.

In addition to scanning for APs of multiple radio types, the mobile node can also scan for other parameters. For example, if the information is included in beacons or other frames (e.g. WiMax DCD or UCD) sent by the APs, the mobile node can determine one or more of the group consisting of regulatory class, physical layer type value, and channel number. Depending on the configuration of APs of the first and second radio type, the other parameters on the report can be the same for both radio types, or different parameters may be returned for each radio type, or even for each AP (e.g. legacy APs may broadcast a limited amount of data whereas a newer or enhanced AP may broadcast additional data).

In accordance with an aspect of the present invention, a mobile node can be directed to scan for neighboring access points of a second type when coupled to an access point of a first type. For example, if a mobile node is associated with one of APs 102, 104, 106, (e.g. WiMax APs) the mobile node can be directed to scan for access points associated with coverage areas 122, 124, 126, 132, 134, 136, 138, 140 and 142 (e.g. WiFi APs). Similarly, if the parent AP of the mobile node is an AP of the second radio type, for example an AP associated with one of coverage areas 122, 124, 126, 132, 134, 136, 138, 140 and 142 (a WiFi AP), the parent AP can direct the mobile node to scan for APs of the first radio type, for example APs 102, 104, 106 (e.g. WiMax APs).

In accordance with an aspect of the present invention, an AP of one radio type can direct a mobile node to roam to an AP of a different radio type. For example, AP 104 (e.g. a WiMax AP) can direct a mobile node to roam to an AP (e.g. a WiFi AP) associated with coverage areas 132, 134, 136, 138, 140 and 142.

There are several techniques available for an AP to determine when to direct a mobile node to roam to an AP of a second radio type. For example, when the mobile node reports APs it found during scans to its parent AP, the parent AP will know which APs of the first radio type or the second radio type the mobile node can roam. Alternatively, or in addition to the aforementioned technique, the AP can also learn the location of the mobile node, which can be accomplished by any of a variety of ways. For example, a mobile node can determine its location and send it to its parent AP. As another example, the mobile node can measure signal strengths or propagation delays of APs it can detect, and send the measurements to the parent AP which can determine the location of the mobile node based on the measurements as described herein supra.

In accordance with an aspect of the present invention, an AP of a first radio type can learn of rogue AP of a second radio type. For example, if a mobile node scans an AP of a second radio type that it determines is a rogue, the report sent by the mobile node to its parent AP can include an entry for the rogue AP, even if the rogue AP is of a different radio type than the first radio type.

In accordance with an aspect of the present invention, an AP of a first radio type (e.g., WiMax) can send a broadcast containing neighboring APs comprising APs of the first radio type and the second radio type (e.g. WiFi). For example, AP 102 can send a neighboring AP report containing APs 104, 106 and APs for coverage areas 122, 124, 126. The neighboring AP report can be sent responsive to a request by a mobile node, or sent as part of a regular beacon or frame (e.g. a TLV coupled to a DCD or UCD message).

If location detection is enabled, the list can be filtered to contain only neighboring APs within a predetermined range of the mobile node. For example, the list can be filtered to list neighboring APs that the mobile node can currently maintain communications, the list can be further filtered by load so that mobile node can roam to a lightly loaded AP. As another alternative, the list can filtered by type of service, e.g., list APs (which include APs of the first radio type, second radio type, or both) which service a multicast stream to which the mobile node is currently subscribed or may be subscribed. As a more specific example, in a WMAN a high-bandwidth IPTV multicast stream may only be forwarded on high-bandwidth WiFi APs; a parent WiMax AP may advertise to a child MN that the IPTV stream is available on a WiFi AP that covers the MN's current location. Alternatively, the list can be filtered by Wireless Metropolitan Area Network, for example listing APs belonging to the same WMAN or ordering the list by WMAN.

Figure 2:
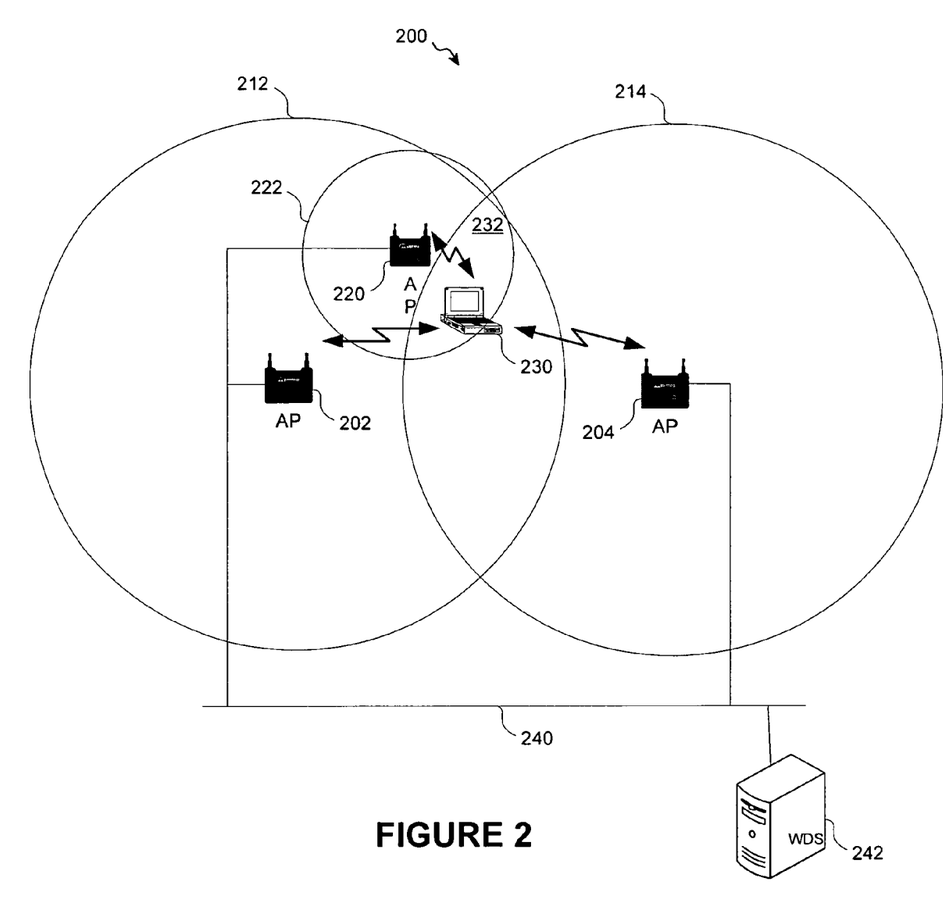
FIG. 2 is a diagram of a network infrastructure for a network that supports multiple radio types, including a wireless domain server.

FIG. 2 is a diagram of a network infrastructure 200 for a network that supports multiple radio types, including a wireless domain server. In this example, APs 202 and 204 are of a first radio type (e.g. WiMax) having associated coverage areas 212, 214 respectively. AP 220 is for a second radio type (e.g. WiFi) and has an associated coverage area 222. Mobile node 230 is in an area 232 that is served by APs of the first radio type, 202, 204 and AP 220 of the second radio type. In this embodiment, APs 202, 204, 220 belong to the same wireless domain and are coupled by distribution network 240 to wireless domain server (WDS) 242.

AP 202 would send a neighboring AP report comprising AP 204 and AP 220. AP 204's neighboring AP report would comprise APs 202 and 220. AP 220's neighboring AP report would comprise APs 202, 204.

When mobile node 230 scans for neighboring access points, the neighboring access point would include APs 202, 204 and 220. If desired, additional characteristics of neighboring APs can be determined. In one embodiment, the APs can advertise their operating characteristics in beacons, probe response frames, DCD/UCP, etc. Alternative, a parent AP for the mobile node can determine the operating characteristics. For example, WDS 242 can maintain a registry (not shown) containing an entry for each AP (e.g. APs 202, 204, 220) in its domain. Thus, when mobile node 230 sends a report to its parent AP (e.g. one of APs 202, 204, 220), the AP can query the registry in order to determine characteristics of APs scanned by mobile node 230. For example, if mobile node 230 is associated with AP 202, the report would contain AP 204 of a first radio type and AP 220 of a second radio type. In order to determine operating characteristics of AP 202 or 220, AP 202 can send a query to the registry maintained by WDS 242. Alternatively, the registry can be maintained at a remote location (not shown) coupled to distribution network 240.

Figure 3:
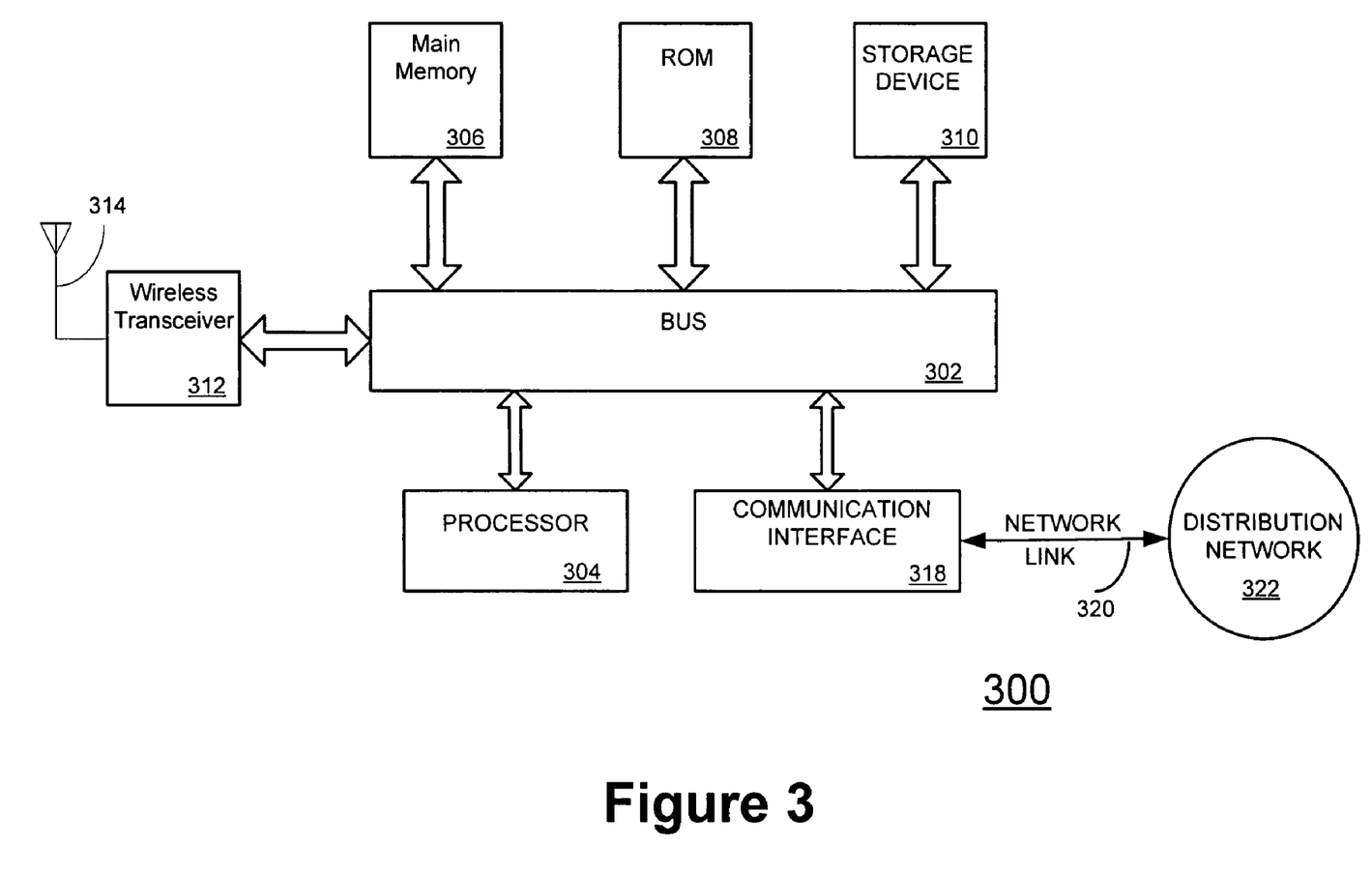
FIG. 3 is a block diagram of a computer system with a wireless transceiver for implementing an aspect of the present invention.

FIG. 3 is a block diagram of a computer system 300 with a wireless transceiver 312 for implementing an aspect of the present invention. Computer system 300 can provide the functionality and control for an access point as described herein for FIGS. 1 and 2. Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing temporary variable or other intermediate information during execution of instructions to be executed by processor 304. Main memory 306 also may be used for storing neighboring access point data as described herein. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

An aspect of the invention is related to the use of computer system 300 for implementing neighbor access point advertisement. According to one embodiment of the invention, the neighbor access point advertisement is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to non-volatile media, volatile media, and transmission media. Non-volatile media include for example optical or magnetic disks, such as storage device 310. Volatile media include dynamic memory such as main memory 306. Transmission media include coaxial cables, copper wire and fiber optics, including the wires that comprise bus 302. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, a carrier wave as described hereinafter, or any other medium from which a computer can read.

Various forms of computer-readable media may be involved in carrying one or more sequences of one or more instructions to processor 304 for execution. For example, the instructions may initially be borne on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306 from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a distribution network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic, or optical signals that carry digital data streams representing various types of information.

Network link 320 typically provides data communication through one or more networks to other data devices. For example, network link 320 may provide a connection through local network 322 to a WDS and/or an AAA server. Distribution network 322 may comprise one or more networks, including but not limited to an Ethernet Network and an IP network. For example, computer system 300 may be coupled to an Ethernet Network that is coupled to an IP network, or directly coupled to either an IP or Ethernet Network.

Computer system 300 can include additional logic for performing the various functions described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

A wireless transceiver 312 is coupled to bus 302. Wireless transceiver 312 sends and receives wireless signals, e.g. RF, IR, Optical, on antenna 314. For signals received on antenna 314, wireless transceiver 312 performs any frequency converting, demodulation, decoding, and/or analog to digital (A/D) conversion that is desired. For signals being sent on antenna 314, wireless transceiver performs any digital to analog (D/A), coding, modulation, and/or frequency conversion desired. Furthermore, processor 304 can control the operation of wireless transceiver 312. For example, packets received on communication interface 318 can be stored in memory 306 and processor 304 can forward the packets from main memory 306 to wireless transceiver 312 for transmission. Furthermore, processor 304 can control the operating parameters of wireless transceiver 312.

Figure 4:
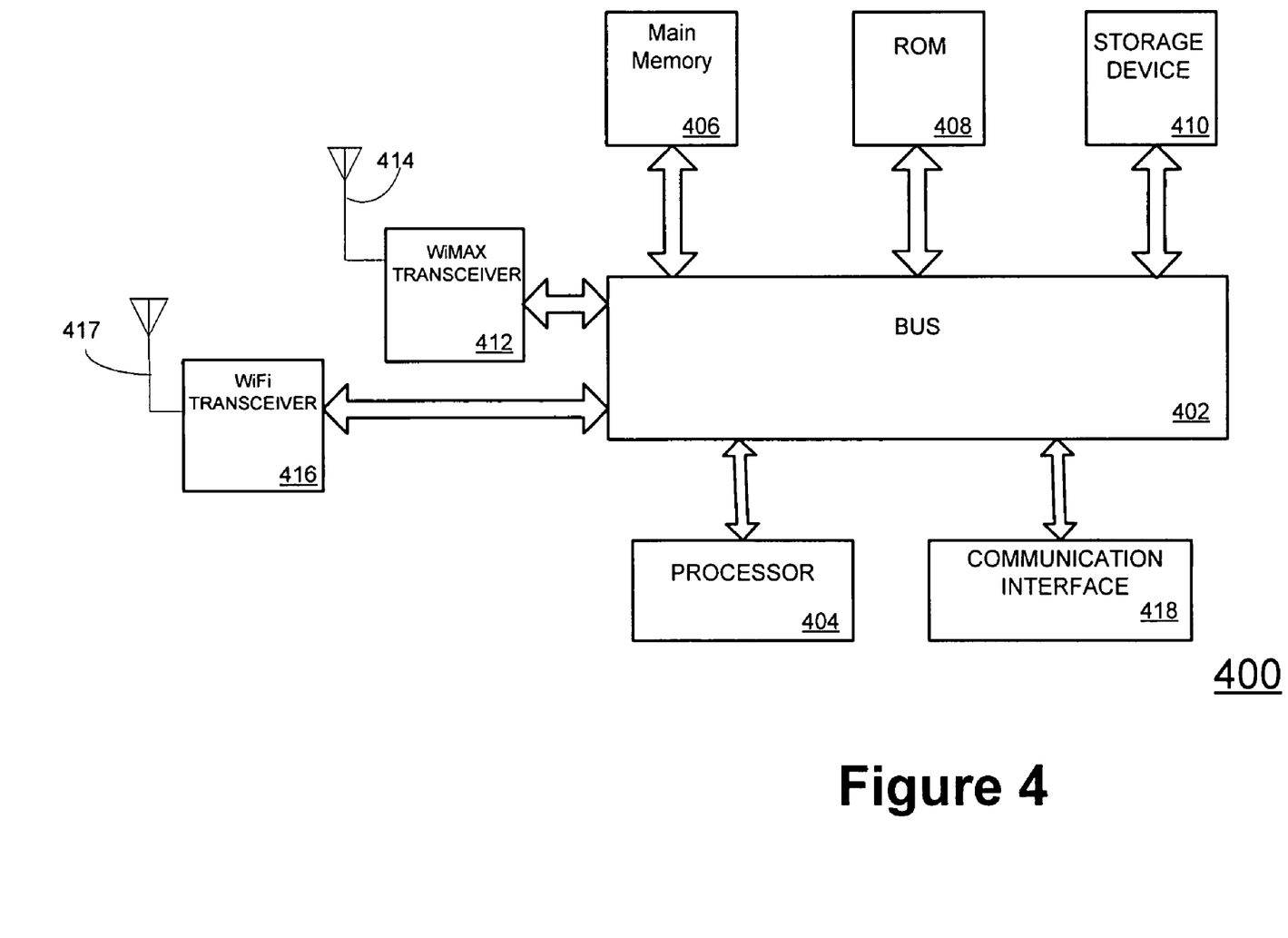
FIG. 4 is a block diagram of a computer system with multiple wireless transceivers for implementing an aspect of the present invention.

FIG. 4 is a block diagram of a computer system 400 with multiple wireless transceivers 412, 416 for implementing an aspect of the present invention. Computer system 400 can provide the functionality and control for a multi-mode wireless mobile node as described herein for FIGS. 1 and 2. Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing temporary variable or other intermediate information during execution of instructions to be executed by processor 304. Main memory 406 also may be used for storing neighboring access point data as described herein. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

An aspect of the invention is related to the use of computer system 400 for implementing neighbor access point discovery according to one embodiment of the invention, the neighbor access point discovery is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406 from which processor 404 retrieves and executes the instructions. The instructions received by main memory 406 may optionally be stored on storage device 410 either before or after execution by processor 404.

Wireless transceivers 412 and 416 are coupled to bus 402. Wireless transceivers 412, 416 operate independently and can be of different radio types. For example, wireless transceiver 412 can be a WiMax transceiver and wireless transceiver can be a WiFi transceiver.

Wireless transceiver 412 sends and receives wireless signals, e.g. RF, IR, Optical, on antenna 414. For signals received on antenna 414, wireless transceiver 412 performs any frequency converting, demodulation, decoding, and/or analog to digital (A/D) conversion that is desired. For signals being sent on antenna 414, wireless transceiver performs any digital to analog (D/A), coding, modulation, and/or frequency conversion desired. Furthermore, processor 404 can control the operation of wireless transceiver 412. For example, packets received on communication interface 418 can be stored in memory 406 and processor 404 can forward the packets from main memory 406 to wireless transceiver 412 for transmission. Furthermore, processor 404 can control the operating parameters of wireless transceiver 412.

Wireless transceiver 416 sends and receives wireless signals, e.g. RF, IR, Optical, on antenna 417. For signals received on antenna 417, wireless transceiver 416 performs any frequency converting, demodulation, decoding, and/or analog to digital (A/D) conversion that is desired. For signals being sent on antenna 417, wireless transceiver performs any digital to analog (D/A), coding, modulation, and/or frequency conversion desired. Furthermore, processor 404 can control the operation of wireless transceiver 416. For example, packets received on communication interface 418 can be stored in memory 406 and processor 404 can forward the packets from main memory 406 to wireless transceiver 416 for transmission. Furthermore, processor 404 can control the operating parameters of wireless transceiver 416.

Figure 5:
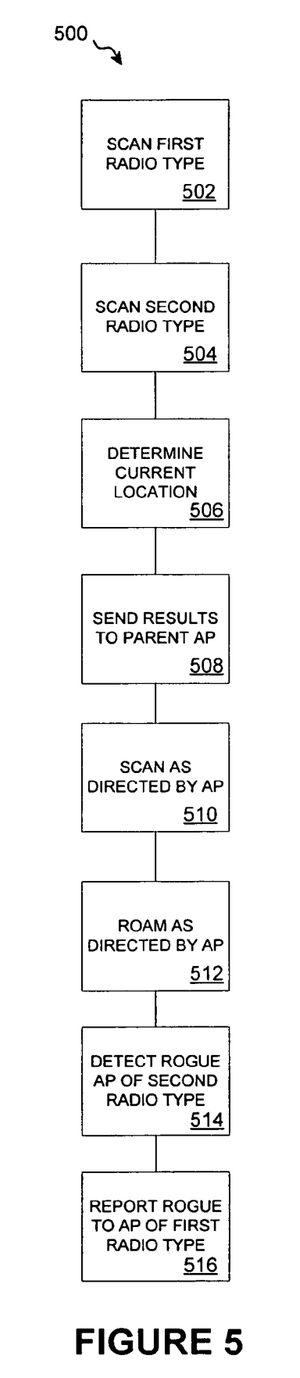
FIG. 5 is a method for AP discovery by a multi-mode mobile node.
Figure 6:
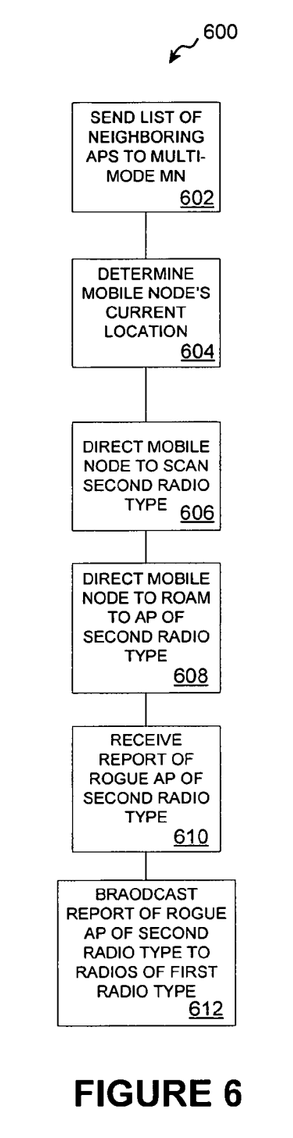
FIG. 6 is a method of AP advertisement for a network with multiple radio types.

In view of the foregoing structural and functional features described above, methodologies in accordance with various aspects of the present invention will be better appreciated with reference to FIGS. 5 and 6. While, for purposes of simplicity of explanation, the methodologies of FIGS. 5 and 6 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof.

FIG. 5 is a method 500 for AP discovery by a multi-mode mobile node. At 502, the mobile node scans a first radio type for neighboring APs of the first radio type. The scanning can be limited to APs belonging to a specific wireless domain, network, or WMAN. At 504, the mobile node scans a second radio type for neighboring APs of the second radio type. The scanning can be limited to APs belonging to a specific wireless domain, network, or WMAN. For example, at 502 the mobile node could scan for WiMax APs and at 504 the mobile node could scan for WiFi APs. During the scans at 502, 504, the mobile node can listen for beacons, probe response frames, DCDs, UCDs or any other frame that enables the mobile node to identify a neighboring AP.

At 506, the mobile node determines its current location. As described herein there are a variety of techniques available for the mobile node to determine its current location. These techniques include, but are not limited to using GPS, measuring signals from neighboring APs and calculating the location based on the measured signals (the calculating can be performed either by the mobile node, its parent AP or any other node communicatively coupled to either the mobile node or the parent AP).

At 508 the results of the scans of 502, 504, and if calculated the current location of the mobile node as determined at 506, are sent to the mobile node's parent AP. An aspect of this report is that the same mobile node address is used to identify the mobile node to both neighboring APs of the first radio type and the second radio type.

At 510, the mobile node scans for neighboring AP as directed by its parent AP. The scan can be for either neighboring APs of the first radio type, neighboring APs of the second radio type, or both. For example, a WiMax AP can direct a dual-mode mobile node to scan for neighboring WiMax APs and/or neighboring WiFi APs. If desired the mobile node can determine its current location as described at 506. Upon completion of a scan requested by the parent AP, the mobile node sends the appropriate data for neighboring APs to the parent AP.

At 512, the mobile node is directed to roam to another (destination) AP. The destination AP can be an AP of the same radio type as the current AP or a different radio type. For example, if a mobile node is associated with a WiMax AP, the WiMax AP can direct the mobile node to roam to either another WiMax AP or to a WiFi AP if the mobile node is near a WiFi AP or hotspot.

At 514, the mobile node detects a rogue AP. The rogue AP is of a second radio type. The mobile node can detect the rogue AP during its scan at 504. At 516, the mobile node reports the rogue AP to an AP of a first radio type. For example, a mobile node can be associated with a WiFi AP and detects a rogue WiMax AP. The mobile node reports the rogue WiMax AP to the WiFi AP. The report can be a special frame designated for reporting rogue APs or can be part of a report as described for 508.

FIG. 6 is a method 600 of AP advertisement for a network with multiple radio types. This method can be performed by an AP with associated multi-mode wireless mobile nodes.

At 602, the AP sends a list of neighboring APs to the multi-node mobile node. The list comprises neighboring access points of a first radio type (e.g. WiMax) and neighboring access points of a second radio type (e.g. WiFi). The list can be filtered and/or sorted by any desired criteria. For example, the list can be filtered by WMAN_ID, radio type, location of neighboring AP, location of mobile node, load, etc.

At 604, the AP determines the mobile node's location. As described herein, the AP can receive the location data from the mobile node, or based on data obtained from the mobile (e.g. signal strengths, list of neighboring APs the mobile node detects) the AP can calculate the mobile node's location.

At 606, the AP instructs the mobile node to scan a second radio type. For example, a WiFi AP can instruct an associated mobile node to scan for neighboring WiMax APs, or a WiMax AP can instruct an associated mobile node to scan for neighboring WiFi APs.

At 608, the AP directs a mobile node to roam to a radio of a second radio type. For example, a WiMax AP that determines a mobile node is near a WiFi hotspot (or based on a neighboring AP report received from the mobile node) can direct the mobile node to roam to the WiFi AP. Similarly, if an AP determines that the mobile node belongs to a multicast stream being serviced by another AP, the AP can direct the mobile node to roam to the AP servicing the stream whether or not the AP is the same radio type. The parent AP may also direct a mobile node to roam to an AP of a different radio type to aid in load balancing.

At 610, the AP learns of a rogue AP of a second radio type. For example, a multi-mode mobile node can learn of the rogue AP during a scan of the second radio type, or while operating in the second radio type. At 612, the AP broadcasts an alert about the rogue AP of the second radio type. This would help increase network security and aid in preventing a mobile node from inadvertently roaming to a rogue AP.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. A method for access point discovery by a single mobile node, the method comprising:
    associating with a parent access point having a first radio type;
    using an address and a first radio associated with an apparatus, scanning for discovery of a first set of access points, the first radio corresponding to the first radio type to detect signals from neighboring access points of the first radio type;
    using the address and a second radio associated with the apparatus, scanning for discovery of a second set of access points, the second radio being different than the first radio and corresponding to a second radio type to detect signals from neighboring access points of the second radio type;
    determining one of the group consisting of regulatory class, physical layer type value and channel number value from a signal received during one of the group consisting of scanning for access points of a first radio type and scanning for access points of a second radio type;
    generating a single report comprising the results of the scanning for access points of the first radio type and the scanning for access points of the second radio type, the single report comprises: i) data representative of the first set of access points detected during the scanning using the first radio, and ii) data representative of the second set of access points detected during the scanning using the second radio; and
    using the address, sending the single report to the parent access point.

2. A method according to claim 1, further comprising:
    receiving a signal from the parent access point of the first radio type requesting a scan for neighboring access points of the second radio type; and
    scanning for neighboring access of the second radio type responsive to receiving the signal from the parent access point.

3. A method according to claim 1, further comprising:
    receiving a signal to roam to an access point of the second radio type from a parent access point of the first radio type; and
    roaming to an access point of the second radio type responsive to receiving the signal to roam.

4. A method according to claim 1, further comprising:
    receiving a list of neighboring access points, the list of neighboring access points comprising neighboring access points of the first radio type and neighboring access points of the second radio type; and
    roaming to a neighboring access point selected from the list of neighboring access points.

5. A method according to claim 1, further comprising:
    determining a parameter indicative of coordinates of a present location; and
    sending a signal containing the parameter indicative of the present location to a parent access point.

6. A method according to claim 5, the determining coordinates further comprising:
    measuring signal strengths of neighboring access points of the first radio type; and
    measuring signal strength of neighboring access points of the second radio type;
    wherein the parameter indicative of coordinates of the present location is the measured signal strengths of neighboring access points of the first radio type and measured signal strengths of neighboring access points of the second radio type.

7. A method according to claim 1, further comprising:
    detecting a rogue access point of the second radio type; and
    sending a message to a parent access point of the first radio type reporting the rogue access point of the second radio type.

8. A method according to claim 1, wherein the first radio type is WiMax or 802.16 compatible and the second radio type is WiFi or 802.11 compatible.

9. A method according to claim 1, wherein access points of the first radio type and access points of the second radio type belong to the same Wireless Metropolitan Area Network.

10. A method according to claim 1, wherein detecting signals from neighboring access points of the first radio type further comprises detecting one of a group consisting of a probe response and a beacon from a neighboring access point of the first radio type; and
    wherein detecting signals from neighboring access points of the second radio type further comprises detecting one of a group consisting of a downlink channel descriptor and an uplink channel descriptor from a neighboring access point of the second radio type.

11. A method according to claim 10, further comprising determining a wireless domain from data acquired from one of a group consisting of a probe response, beacon, and downlink channel descriptor for each neighboring access point detected.

12. A method according to claim 10, further comprising determining a wireless domain from a Type Length Value in one of a group consisting of a probe response and beacon from a neighboring access point of a first radio type; and
    determining a wireless domain from a Type Length Value in a downlink channel descriptor from a neighboring access point of a second radio type.

13. A method according to claim 12, further comprising determining which access points belong to the same wireless domain based from the Type Length Value in one of a group consisting of a probe response and beacon from neighboring access points of a first radio type, and from the Type Length Value in a downlink channel descriptor from a neighboring access point of a second radio type.

14. A single mobile node configured for selective association with an associated parent access point having a first radio type, the single mobile node comprising:
- a first radio corresponding to the first radio type of the associated parent access point, the first radio being configured to scan, using an address, for discovery of a first set of neighboring access points;
- a second radio corresponding to a second radio type different than the first radio type of the associated parent access point, the second radio being configured to scan, using the first address, for discovery of a second set of neighboring access points; and
- a processor communicatively coupled with the first radio and the second radio;
- the processor determining one of the group consisting of regulatory class, physical layer type value and channel number value from a signal received during one of the group consisting of scanning for access points of a first radio type and scanning for access points of a second radio type;
- the processor generating a single report comprising the results of the scanning for access points of the first radio type and the scanning for access points of the second radio type, the single report comprises: i) data representative of the first set of access points detected during the scanning using the first radio, and ii) data representative of the second set of access points detected during the scanning using the second radio; and
- a transmitter, using the address, sends the single report to the associated parent access point.

* * * * *